(No Model.)
R. H. WHIPPLE.
Attachment for Corn Planters.
No. 235,662. Patented Dec. 21, 1880.
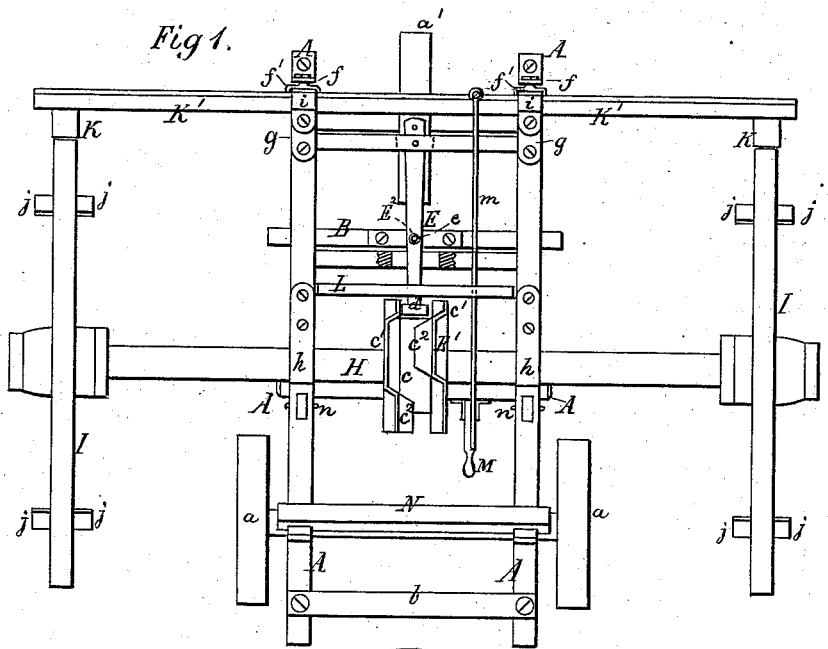
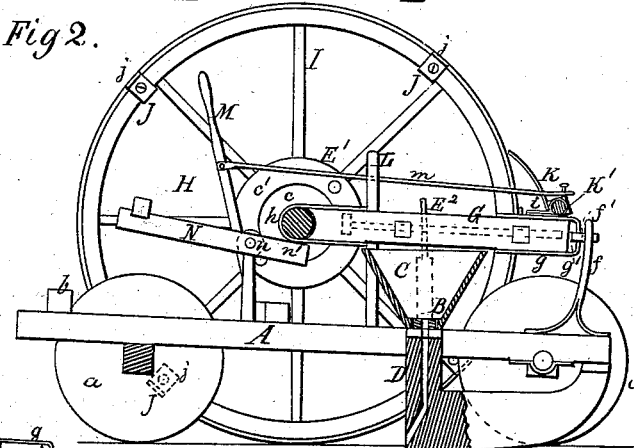
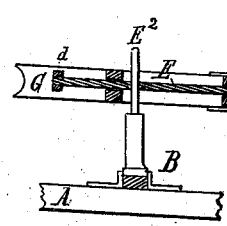
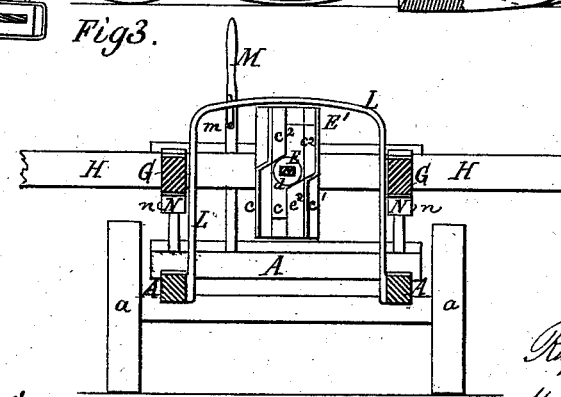
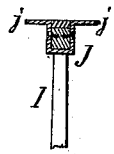
Witnesses:
Inventor:
Rufus H. Whipple
by
Mason Fenwick Lawrence
Attorneys

UNITED STATES PATENT OFFICE.

RUFUS H. WHIPPLE, OF OTISVILLE, IOWA.

ATTACHMENT FOR CORN-PLANTERS.

SPECIFICATION forming part of Letters Patent No. 235,662, dated December 21, 1880.

Application filed May 14, 1880. (No model.)

*To all whom it may concern:*

Be it known that I, RUFUS H. WHIPPLE, a citizen of the United States, residing at Otisville, in the county of Franklin and State of Iowa, have invented a new and useful Improvement in Attachments for Corn-Planters, of which the following is a specification.

My invention relates to that style of corn-planter which is operated by a cam on its long axle, and which marks off the ground by markers at the ends of said axle; and the objects of my improvements will be fully explained in the specification.

In the drawings, Figure 1 is a top view of a corn-planter frame with my improved attachment applied to it. Fig. 2 is a vertical longitudinal section of the same, a hopper and furrow-opener being shown applied to the corn-planter frame. Fig. 3 is a vertical transverse section of Fig. 1, looking toward the rear of the machine. Fig. 4 is a detail longitudinal section; and Fig. 5 is a section of a portion of one of the driving and marking wheels, showing the improved marker in cross-section.

Similar letters of reference refer to similar parts in all the views.

The corn-planter frame A may be of the usual or any approved construction, and it may have any of the ordinary dropping devices and furrow-openers applied to it; but its hoppers should be adapted for employing the ordinary laterally-vibrating seed-slide B, for depositing the corn into the devices which conduct it to the ground.

The frame in Fig. 1 is shown mounted on three wheels, $a$ $a$ $a'$, and in Fig. 2 as provided with a hopper, C, and furrow-opener and seed-conductor D, of a well-known construction.

A hopper and furrow-opener such as shown are employed on each side of the frame, in line with a wheel, $a$, and the one slide, B, passes through both of the hoppers, and is operated by a single vibrating lever, E, and cam E', through a single upright rod, E²; but in some corn-planters each hopper has its own slide, and in such case each slide will be operated by a vibrating lever, E, cam E', and rod E².

The frame G of the marker, scraper, dropper, starter, and stopper, as well as dropping-regulator, is carried upon a long axle, H, (say eight feet long,) on either end of which is attached a large wheel, I, resembling an ordinary driving sulky-wheel, these wheels being just large enough in diameter to afford a circumference or rim which will mark four rows in each revolution. It is designed that the wheels shall stand just far enough from either side of the planter that in planting across the field and back one of the wheels shall run in its own track on returning. The wheels I have broad treads, and by their traction they revolve the axle H and the cam E', which is on this axle.

On the felly of each wheel, at a distance, say, three feet ten inches apart, are placed metal markers J, which, in passing around with the wheels, leave an impression upon the soil, which can be plainly seen by the driver while upon his seat $b$. These markers are in form of the letter U in their body portion, and have broad flanges $j$, which stand flush with the periphery of the wheels when the U portions are made to fit round the inner periphery and sides of the fellies, as shown. This construction of the markers obviates projections on the periphery of the wheel and admits of the scrapers K being applied directly against the tire of the wheels, for the purpose of clearing mud and other matters therefrom. The stampers or markers J, as usual, serve for insuring correct planting—that is, in passing back across the field the markers on the wheel which runs in its own track will fall or strike in the same spots, and thus indicate to the driver that he is planting the corn properly, or, if he is out of row, indicate the fact to him, and he can then stop the dropping by raising the traction-wheels I off the ground, and readjust the markers J, by turning the axle and wheels around with his hand until the markers fall into the marks previously made in going forward over the field.

The cam E' is made fast on the axle, and it is in serpentine form, consisting of a solid hub, $c$, two waved ring-plates, $c'$, and four blocks, $c^2$, set diagonally opposite one another, between the plates, so as to leave a space between them for a friction-roller, $d$, to travel in. The roller $d$ is on the end of the vibrating lever E, which actuates the dropping-slide B through the upright rod E². This cam makes a revolution every time the wheels I make one, and ceases to move when said wheels and the axle are stopped. It revolves toward the front of the machine, and in revolving it causes the horizontal lever E to pass quickly backward and forward. The friction-roller $d$, being arranged on a plane with the horizontal axis of the hub of the cam E', always points about in a line with said axis, and therefore, if one of the large wheels I is raised to any distance, the movement of the lever E will not be affected thereby, and the corn will be dropped with the same speed, whether the large wheel moves over a plane or a hill.

In order to insure a truly vertical movement of the frame G, it is connected at the front ends of its side beams to the planter-frame A by means of standards $f$, provided with eye-pieces $f'$, and by oblong strap-plates $g$, provided with vertical loops $g'$, as shown, and it is also guided by an inverted-U-shaped standard, L, which is attached to the planter and extends up alongside the inner surfaces of the side beams of the frame G. The loops $g'$ and the standard L permit independent vertical movements of either of the frames A and G, but prevent all sidewise movement of the same. Thus the planter-wheels can ride over obstructions, and rise and fall, without interfering with the dropping operation. These movements are permitted by the stem of the rod $E^2$ playing loosely in the hole $e$ of the lever E, and the beams of the frame G being loosely strapped at $h$ to the long axle H.

The scrapers K are applied on a turning-bar, K', which is strapped loosely at $i$ to the beams of the frame G. A hand-lever, M, is connected to the bar of the scrapers K by a rod, $m$, and by this means the scrapers can be thrown against or off from the peripheries of the wheels I.

A treadle-frame, N, for throwing the axle H and the wheels I in and out of operation, is pivoted at $n$ to uprights on the planter-frame A, and the short ends $n'$ of its lever-beams are extended under the axle H, as shown. By means of this frame the driver, from his seat $b$, can elevate the wheels off the ground, and thereby stop the revolution of the axle and the operation of dropping corn.

My attachment for corn-planters can be readily adapted to machines in use, as the frame G and its adjuncts can be placed immediately over the planter-frame without interfering with any of the adjuncts of the same, and the check-rower can be changed to drill by putting on a cam-wheel having six, instead of four, cam-projections.

What I claim as my invention, and desire to secure by Letters Patent, is—

1. The rigid long axle H, carrying large traction and marking wheels I, having a broad tread, frame G, connected by oblong loops $g'$ to the corn-planter frame A, the guide-standard L within the frame G, and attached to the frame A, the cam-wheel E', the horizontal lever E, upright rod $E^2$, and dropping-slide B, all combined and operating substantially as and for the purpose described.

2. In combination with the frames A and G, connected together at their front ends by means of standards $f$, eyes $f'$, and oblong loops $g'$, the guiding-standard L, substantially as described.

3. The combination of the frame G, carrying the long axle H and wheels I, the frame A, loop-connection $f'$ $g'$ at front of the frames A and G, lever E, slide B, vertical rod $E^2$, loosely connecting the slide and lever, cam E', and lever-treadle frame N, substantially as and for the purpose described.

4. The combination, with the frames A and G, having loop-connection $f'$ $g'$, of the vertical rod $E^2$, connecting the slide B and lever E of said frames, whereby the frame G can be raised on the rod $E^2$ for the purpose of stopping the planting operation, and whereby each frame is allowed an independent vertical movement without liability of stopping the said operation, substantially as described.

RUFUS H. WHIPPLE.

Witnesses:
M. A. BARNARD,
JACOB ELLIS.